United States Patent [19]

Haas, Sr. et al.

[11] 4,454,834

[45] Jun. 19, 1984

[54] INSTALLATION FOR THE COATING OF INDIVIDUAL WAFER SHEETS OR THE LIKE WITH A SPREADING MASS

[76] Inventors: Franz Haas, Sr., Gerstlgasse 25, A-1210 Wien; Franz Hass, Jr., Kreutgasse, A-2100 Leobendorf; Johann Hass, Seitweg 4, A-3400 Klosterneuburg, all of Austria

[21] Appl. No.: 379,866

[22] Filed: May 19, 1982

[30] Foreign Application Priority Data

May 20, 1981 [AT] Austria .................................. 2266/81

[51] Int. Cl.$^3$ .............................................. B05C 5/00
[52] U.S. Cl. .................................... 118/676; 118/686; 118/15; 118/17; 118/13; 118/24; 118/41
[58] Field of Search ................... 118/24, 202, 25, 239, 118/15, 244, 13, 40, 42, 70, 17, 41, 676, 668, 686

[56] References Cited

U.S. PATENT DOCUMENTS

| | | | |
|---|---|---|---|
| 1,606,721 | 11/1926 | Rihl | 118/24 X |
| 2,620,767 | 12/1952 | Lehman | 118/13 X |
| 2,776,639 | 1/1957 | Labine et al. | 118/41 |
| 3,035,540 | 5/1962 | Cohen et al. | 118/24 X |
| 3,353,517 | 11/1967 | Tower | 118/261 |
| 3,654,894 | 4/1972 | Rohrbacher et al. | 118/24 X |

FOREIGN PATENT DOCUMENTS 488475  7/1938  United Kingdom .................. 118/15

*Primary Examiner*—John P. McIntosh
*Attorney, Agent, or Firm*—Schwartz, Jeffery, Schwaab, Mack, Blumenthal & Koch

[57] ABSTRACT

An installation for coating baked products, such as wafer sheets, with a viscous, edible spreading mass, such as caramel, includes a transport installation for moving the wafers and a revolvable, generally cylindrical coating roll above the transport installation. An application reservoir cooperates with the coating roll to spread a layer of the spreading mass on the surface of the coating roll. A coating roll squeegee controls the thickness of the spreading mass on the coating roll, and a coating roll blade removes the spreading mass from the coating roll in the form of a layer. This layer of spreading mass is then deposited on the wafers transported by the transport installation. The viscous material of the spreading mass will be continuous and will tend to join the separate wafer sheets together when the layer is deposited on the wafer sheets. In this regard, a separating device is disposed downstream of the coating roll. The separating device includes at least one separating blade with a cutting edge to separate the wafer sheets joined in this manner.

62 Claims, 18 Drawing Figures

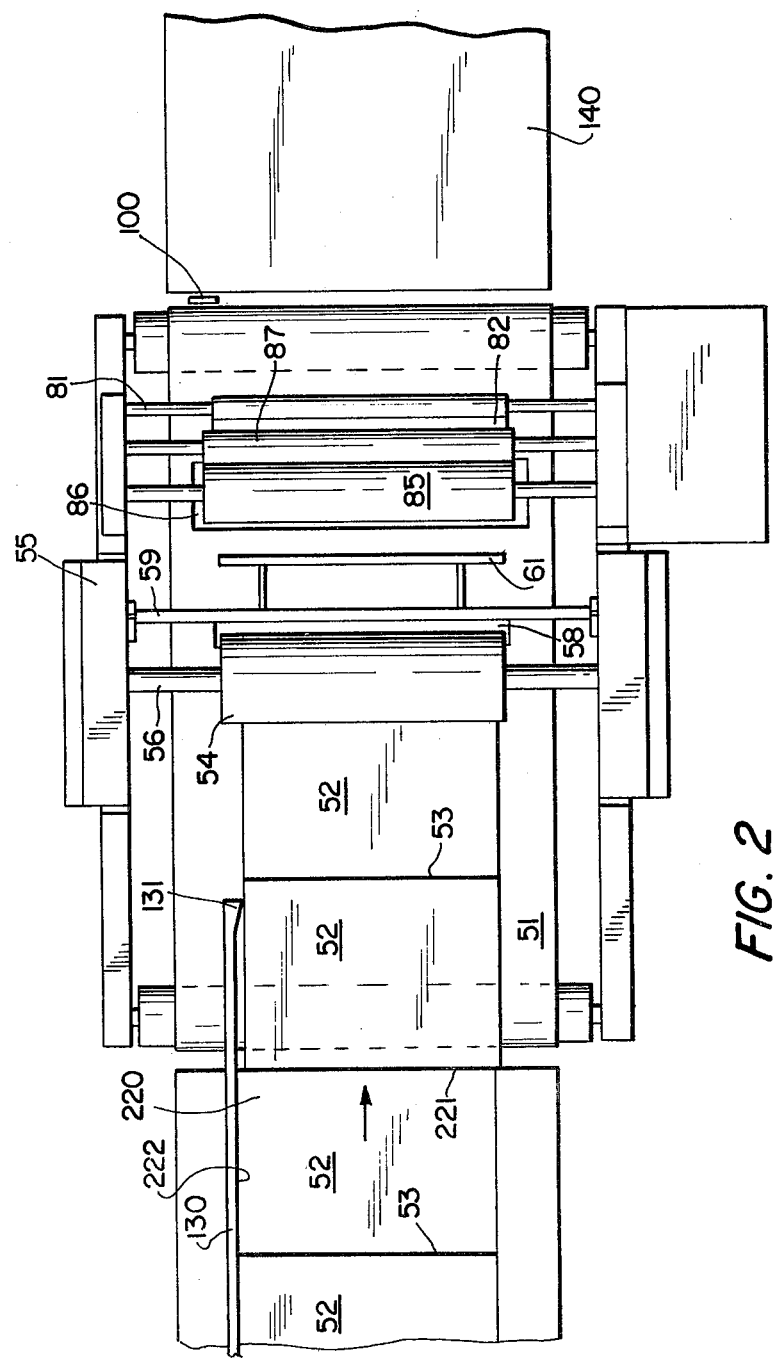

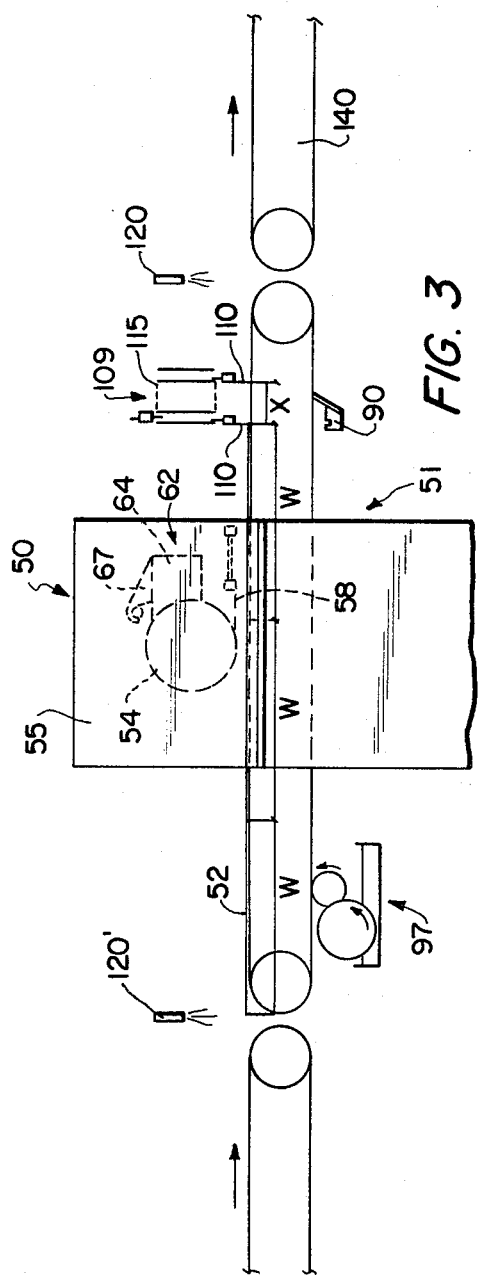
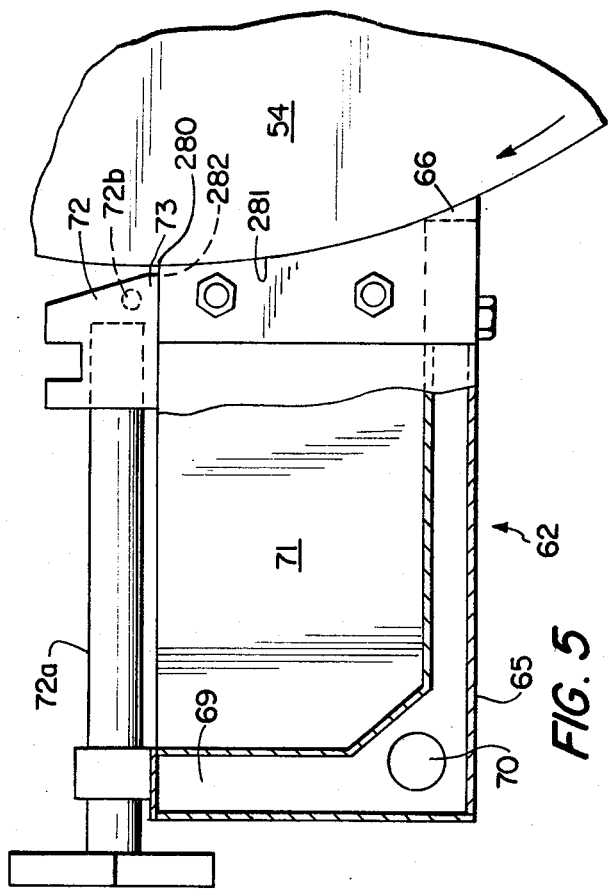
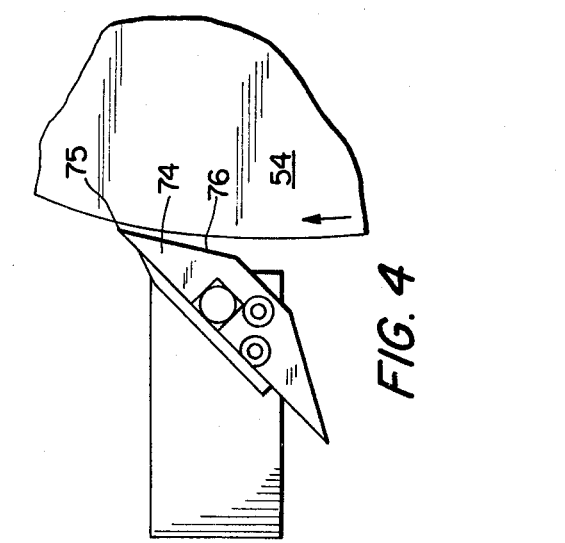

INSTALLATION FOR THE COATING OF INDIVIDUAL WAFER SHEETS OR THE LIKE WITH A SPREADING MASS

BACKGROUND OF THE INVENTION

1. Field of the Invention

The invention concerns an installation for the coating of individual wafer sheets or the like, transported adjacently to each other on a conveyor installation. Baked products, such as wafer sheets, are coated with a spreading mass, in particular with a mass that is viscous or highly viscous at the temperature of application only, such as, for example, caramel or the like.

2. Description of the Prior Art

In the food and confectionary industry, coated wafer sheets are stacked in so-called block formers into filled water blocks and further processed into different wafer products.

Machine-made wafer or waffle products, marketed filled or without fillings, are generally known as confections in the food and confectionary industry. These products of the wafer industry are, for example, wafer cones, wafer cups, wafer plates, flat wafer disks, low hollow wafers, hollow bars, wafer rolls, ice cream cones, filled wafers, small filled wafer bars, wafer sections, ice cream wafers and the like. These wafer products are baked products made of wafer batter or dough of a crispy, brittle and fragile consistency.

The different wafer products may be produced in different ways. Thus, certain wafer products are baked in their final form, such as, for example, wafer cones, wafer cups, wafer disks, how hollow wafers, or the like.

In the production of the other wafer products, a wafer sheet or an endless wafer strip is first baked and given its final shape while still in its soft, baking state, after which the wafer product is cooled to assume its crisp, brittle consistency. Examples are sugar ice cream cones, hollow bars, sugar wafer rolls and the like. For the production of further types of wafer products, several wafer sheets are baked, cooled coated with a spreading mass, such as, for example, a cream, and stacked to form a block of wafers. The filled wafer blocks are subsequently cut into small, handy pieces of uniform size, which are then packed into units consisting of one or several pieces, possibly in airtight packages, and marketed in that form.

Depending on the product, the wafer products may be provided with various coatings of, for example, sugar of chocolate, or may be given different fillings such as, for example, ice cream, chocolate or the like.

The aforedescribed wafer or waffle products differ from the waffles baked in the home in a conventional manner in waffle irons. The latter are a soft, roll or pancake-like baked product. These waffles produced in the home have a similarity with respect to their consistency and applicability to the aforedescribed wafer products of the wafer industry.

Devices for the application of a layer of cream to wafer sheets by a film coating process are known. In the film coating process, wafer sheets which abut against each other with their front edges and which are arranged on a conveyor belt, are coated with a cream. In this regard, a film of cream is taken continuously with a blade from a coating roll and deposited under it onto the wafer sheets transported by the conveyor belt. A belt, following the conveyor belt in sequence and running more rapidly, separates the coated wafer sheets which abut against each other with their front edges, so that a sufficiently large distance is created between the sheets to allow their subsequent stacking. This running belt guides the spaced-apart, individual wafer sheets to a stacking device. In the known devices for the application of a layer of cream, a coating roll and a scraper roll are arranged underneath a storage funnel for the cream. The scraper roll determines the thickness of the layer of cream on the coating roll. The cream storage funnel is arranged at the apex of the coating roll and the scraper roll follows the latter in the direction of rotation. The blade taking the film of cream from the coating roll is located in the area of the bottom crest line of the coating roll. The conveyor belt for the wafer sheets, which sheets are transported adjacently to each other, is located below the coating roll and is followed by a belt running rapidly in the direction of transport and guiding the wafer sheets, now separated from each other, into a stacking device.

The disadvantage of these known devices resides primarily in the fact that spreading masses which are highly viscous in their processing state and which solidify rapidly during cooling, cannot be processed. This is because the spreading mass solidifies so rapidly during application that separation of the wafer sheets, which abut against each other with their front edges and which are connected with each other by the layer of the spreading mass, no longer becomes possible simply by the use of different belt velocities of two successive transport belts. If the processing temperature is increased to make possible the separation of successive, coated wafer sheets by two conveyor belts following each other and revolving at different velocities, the spreading mass will be drawn apart into threads when successive wafer sheets are pulled apart as a result of the consistency of the mass. This soils both the front edge of each wafer sheet and also the conveyor belt between two successive wafer sheets. Furthermore, if two successive wafer sheets again come into contact with each other, they adhere to each other. For the aforedescribed reasons, the known devices for the application of creams by the film coating process are not suitable for the processing of spreading masses which are viscous to highly viscous at the temperature of application and which are adhesive, such as, for example, caramel or Products similar to Turkish delight.

SUMMARY OF THE INVENTION

It is the object of the present invention to provide an installation whereby spreading masses, with a consistency that is viscous to highly viscous only at the temperature of application, may be processed. The object is attained, beginning with an installation for the coating of individual wafer sheets or similar baked products. The sheets or the like are transported adjacently to each other on a conveyor installation. The coating installation handles a spreading mass, in particular a mass which is viscous to highly viscous and adhesive only at the temperature of the application, such as, for example, caramel or the like. A revolving, preferably heated, coating roll carrying a layer of the spreading mass is arranged above the transport or conveyor installation. A preferably heatable coating roll blade, arranged above the conveyor installation, is applied against the surface of the coating roll in the area of its lower crest or apex. The coating roll blade takes the layer of the spreading mass from the coating roll and deposits it on the wafer sheets moved under the coating roll by the transport or conveyor installation. The wafer sheets are in a condition in which they abut against one another with their front edges. Subsequently, they will be spaced apart according to the invention. For the application of the preferably adhesive and viscous spreading mass to the coating roll, a preferably heatable application reservoir is provided. The application reservoir follows the coating roll blade in the direction of rotation of the coating roll. The application reservoir is arranged above the blade and in front of the lower apex or crest line (i.e., lowermost point) of the coating roll when considered with respect to the direction of rotation of the coating roll. The application reservoir is followed in sequence (with respect to the direction of rotation of the coating roll) by a coating roll squeegee which is preferably adjustable with respect to the surface of the coating roll. A separating device may follow the coating roll in the direction of transport of the wafer sheets. The separating device separates the wafer sheets which have been joined together by the layer of the spreading mass. This arrangement enables the processing of different spreading masses at the ideal spreading temperature on the coating roll, because the spreading mass involved remains on the coating roll for a sufficiently long period of time to assume the ideal spreading temperature. Furthermore, by means of the arrangement according to the invention, the diameter of the coating roll may be kept small by arranging the application reservoir as far as possible to the rear of the coating roll, when viewed in the rotating direction of the coating roll. The direction of rotation of the coating roll may be chosen so that the layer of the spreading mass moves in a transfer area onto the wafer sheets in the same direction as that in which the wafer sheets travel. According to a further form of embodiment, the direction of rotation in the area of transfer may be against the direction of transport of the wafer sheets.

According to a further characteristic of the invention, the application reservoir may be pivotable around an axle parallel to the rotating axle of the coating roll, the axle of the reservoir being closer, when viewed in the direction of transport of the wafer sheets, than the center of gravity of the application reservoir filled with the spreading mass. In this manner, the application reservoir is sealed against the surface of the coating roll by the weight of the filled mass reservoir itself.

According to a further characteristic of the invention, the application reservoir is equipped with a jacket enclosing the space for the spreading mass and open in the direction of the coating roll. This results in easy control of the temperature of the spreading mass in the application reservoir, thereby assuring a constant temperature value during the entire spreading process. The heating of the application reservoir may be effected by heating means arranged in the jacket, for example, an electric heating rod, or by a liquid filling heated to the temperature desired. Preferably, the application reservoir is equipped with an oil-filled jacket. The heating of the oil may be effected by a heating rod located in the oil jacket. Alternatively, the jacket may be supplied with oil from the outside, the oil being preheated to the temperature desired.

It is further provided according to the invention that the coating roll squeegee following the reservoir (in the direction of rotation of the coating roll) is in the form of a displaceable strip mounted on the reservoir. It is advantageous that, to adjust the thickness of the layer of the spreading mass on the coating roll, it is merely necessary to move the squeegee on the reservoir to and from the surface of the coating roll.

A further characteristic of the invention resides in the fact that the coating roll squeegee is arranged above the application reservoir, separately from it. The advantage of this configuration is that the squeegee may be removed by itself for cleaning, without having to disassemble the entire reservoir. Such cleaning may be required, for example, when caramel is used as the spreading mass and the sugar contained therein begins to crystallize on the squeegee and to adhere to the surface of the squeegee.

The invention further provides that, in the case of masses that are viscous to highly viscous and adhesive at the temperature of application, there is a separating device equipped with at least one separating blade to separate the wafer sheets which abut against each other with their front edges. The blade is coated with a film preventing the adhesion of the spreading mass to the blade. This arrangement insures effective separation of the layer of the spreading mass at the joining locations of successive wafer sheets.

According to a further characteristic of the invention, the separating device is equipped with a rotatable cutter bar arranged transversely to the direction of transport and coated at least at its edge with a film of oil. The coating of the edge of the separating blade with oil insures that the spreading mass does not adhere to the blade when cut. Furthermore, the blade deposits a thin film of oil onto the front sides of the coated wafer sheets, both on the sheet itself and on the layer of the spreading mass. This ensures that, during the further transporation of the wafer sheets, the limiting elements of a block forming device following the coating installation according to the invention, or other parts of the block forming device, are not contaminated by particles of the spreading mass. This is of particular importance in the case where caramel masses or the like constitute the spreading mass, as the adhesion of individual caramel particles to parts of the block forming device would lead to the soiling of these parts and of the subsequent transportation means, resulting in appreciable interference with the operation of these parts.

According to a further characteristic of the invention, not only the front edges of coated wafer sheets are provided with a film of oil, but the elements of the block forming device which are in contact with the front edges of coated wafer sheets are also coated with a film of oil, preventing the adhesion of the spreading mass. This may be effected simply by applying a film of oil to the elements involved, but the elements themselves may also be coated with a layer of Teflon or the like.

In a further development of the invention, for the application of a film of oil to the edge of a blade, an oiling roll is arranged in parallel disposition to the blade and is capable of contacting it. The oiling roll is in circumferential contact with a feed roll dipping into an oil bath. By these means, the edge of the blade can be recoated with oil after each separation. The oiling roll and the feed roll may be supported in a freely rotating manner so that they are rotated merely by the contact of a blade with the oiling roll.

According to a further configuration of the invention, a light barrier cooperating with the spreading roll is arranged at the end of the transport installation for the wafer sheets. The light barrier triggers the onset of the movement of the blades for separating the wafer sheets which abut against each other. In the process, the leading edge of a wafer sheet (when considered with respect to the direction of transport) triggers the blade involved, i.e., it actuates the drive of the blade, so that the separation of successive wafer sheets is effected always exactly at their joining location. The light barrier may be spaced from the rotating axis of the cutter bar by the length of a wafer sheet in the transport direction reduced by a distance X corresponding to the path of the blade edge in its rest position to the edge of the wafer sheet. This prevents the premature actuation of the separating device and thus the shortening of the wafer sheet.

It may further be provided by the invention that the blades separating the wafer sheets are in the form of blades revolving in the cutting direction and moving along the edge of the wafer sheet transversely to the transport direction. This configuration makes higher transport velocities for the wafer sheets possible, since the revolving blades move during the cutting with the wafer sheet in the direction of transport.

The revolving blades may be mounted according to the invention on an endless chain or the like arranged over the transport installation for the wafer sheets, the chain revolving transversely to the transport direction of the wafer sheets, with the separating blades extending to the surface of the transport installation. This makes it possible to arrange the separating device directly above the transport installation for the wafer sheets. The endless chain may revolve in a plane perpendicular to the transport installation, but the plane may also be slightly inclined with respect to the transport path of the wafer sheets, with the revolving blades being arranged perpendicularly to the transport path of the wafers. The endless chain may be arranged so that both the lower and the upper strands of the chain are in planes parallel to the path of the wafer sheets and are inclined to the direction of transport of the wafer sheets. This latter arrangement results in a particularly space-saving configuration of the separating device.

According to a further characteristic of the invention, the revolving blades are mounted on an endless chain arranged under the transport path of the wafer sheets and revolve transversely to it, with the blades protruding from below over the track of the wafer sheets.

The invention further provides that a light barrier is arranged both at the start and at the end of a segment of the transport device moving the wafer sheets past the coating roll and under it (i.e., the "coating roll segment"), with the distance of the two light barriers preferably corresponding to an integer multiple of the length of the wafer sheets to be coated, as measured in the direction of transport. The spacing between the two light barriers in each instance is measured from the front edges of successive wafer sheets. The light barriers actuate the separating device whenever the two light barriers signal the presence of the leading edge of a wafer sheet. In this manner, the shortening of all successive wafer sheets is prevented, when a somewhat shorter wafer sheet or one with parts missing, is present.

According to a further aspect of the invention, a transport segment of the transport installation follows the coating roll segment. The transport velocity of the subsequent transport segment is higher than that of the coating roll segment. It is thus made possible in a simple manner for the light barrier at the end of the coating roll segment of the transport installation to always accurately detect the presence of a leading edge of a wafer, since the successive wafer sheets are drawn apart by the different transport velocities.

A further characteristic of the invention resides in the fact that the separating device is installed between the coating roll segment and the transport segment which moves at a higher velocity. This arrangement results in an especially compact separating device and makes it possible to design the separating device as a separate structural unit.

In order to enable the light barrier provided at the beginning of the transport installation associated with the coating roll to detect the leading edge of a wafer sheet without ambiguity, the wafer sheets are, according to the invention, guided laterally along their track, and a wedge is provided on one side. The wedge protrudes into the path of the wafer sheets and displaces them laterally. The wedge is located in front of the light barrier at the onset with the coating roll segment, while the light barrier is placed over the path of the wafer sheets in the area of their corners. This configuration renders the leading edge of successive wafer sheets recognizable by the light barrier in a very simple manner.

In order to render possible the unambiguous operation of the installation according to the invention even in the case of wafer sheets with missing corners, a further development of the invention provides that the coating roll segment is preceded by three successive transport segments for the wafer sheets, the second segment of which as viewed in the transport direction has the same velocity as the coating roll segment while the two others operate at a slightly higher velocity. Preferably, the second transport segment has a drive which is coupled with the coating roll segment, for example, by means of mechanically coupled drives. The two more rapidly revolving transport installations may be driven independently, thereby making different transportation velocities possible, or they may be driven together by a single drive. This arrangement ensures the abutment of the individual wafer sheets against each other in the range of the second segment of the transport installation. It also ensures that a gap is created between successive wafer sheets by virtue of the difference in the transport velocities between the second and the third segments of the transport installation. This gap is reclosed by the third segment. Conveniently, a light barrier is arranged between the second and the third segments of the transport installation. This enables the light barrier to accurately detect the leading edges of the wafer sheets which abut against each other with their front edges, so that variations in the length of the wafer sheets within their manufacturing tolerances will not lead to a summation or stacking of tolerance errors. Furthermore, the possible absence of corners of a wafer sheet will not effect its coating and subsequent separation.

A further characteristic of the invention resides in the use of an oiling device for the conveyor belt, which device is preferably located underneath the conveyor belt of the transport installation and arranged under the coating roll. By means of this arrangement, the surface of the conveyor belt in contact with the wafer sheets of the conveyor belt is coated with a thin film of oil so that particles resulting from the cutting operation of the spreading mass will not adhere to the conveyor belt and may easily be removed preferably by a heated squeegee.

According to the invention, the oiling apparatus consists of an oil reservoir with a transfer element applying the oil to the surface of the conveyor belt. In keeping with one form of embodiment of the invention of the transfer element may be composed of a strip of an absorbent material having ends, the strip protruding with one end into the oil reservoir. This configuration assures the application of a thin film of oil to the conveyor belt, with the amount of oil applied to the conveyor belt being determined by the absorbency and the thickness of the material of the transfer element. This material may, for example, be composed of a strip of felt fastened to a rail and resting against the conveyor belt of the transport installation.

According to a further form of embodiment of the invention, the oiling apparatus comprises an oiling roll in circumferential contact with the surface of the conveyor belt and a feed roll in circumferential contact with the oiling roll and dipping into the oil reservoir. In this form of embodiment, the two rolls are driven by the oiling roll in contact with the conveyor belt, while the amount of oil applied adjusts automatically to the prevailing circumferential velocity of the conveyor belt.

According to a further characteristic of the invention, the feed roll is of a metal roll. It has a lower part which dips into the oil in the oil reservoir and entrains a film of oil on its surface in its rotation. This film of oil is then transferred to the oiling roll. The thickness of the oil film on the feed roll is determined, on the one hand, by the viscosity of the oil and, on the other hand, by the circumferential velocity of the feed roll or its surface, which may be smooth or rough.

The oiling roll may, according to the invention, be composed of foam rubber or may be merely covered over its circumference with a layer of felt.

In a further development of the invention, in the case of blades revolving transversely to the direction of transport, a cleaning and/or oiling apparatus for the edges of the blades may be provided laterally of the wafer path. This prevents the adhesion of spreading mass particles to the blades so that the wafer sheets are cleanly cut in the cutting process.

According to a further characteristic of the invention, the cleaning apparatus for the blades is an elastically yielding squeegee, which may be displaced from its position by the blades during the passage of the blades through the cleaning apparatus. This provides a mechanical cleaning of the blades, which is adequate with certain spreading masses.

In order to prevent the adhesion of spreading mass particles in the case of strongly adhesive spreading masses, an oiling device composed of transfer elements arranged alongside the path of the blades and dipping into an oil reservoir is provided for the blades according to a further characteristic of the invention. This oiling device is conveniently arranged laterally of the path of the wafer sheets and is traversed by the blades immediately preceding the separation process.

In a further embodiment of the invention, the separating blades which revolve transversely to the direction of transport are equipped with edges perpendicular to the direction of transport. This makes possible a particularly gentle handling of the leading edges of successive coated wafer sheets, since the blades, with their edges arranged perpendicularly to the direction of transport, slide along the front edges of the wafer sheets. Conveniently, the edges of the revolving blades which move between the leading edges of successive coating wafer sheets, are very thin.

According to a further characteristic of the invention, the blades which revolve transversely to the direction of transport are thin pins, whereby the contact between the blade and the leading edge of each wafer sheet is minimized.

A further characteristic of the invention provides that, in the case of blades revolving transversely to the direction of transport, the endless chain or the like which carries the separating blades pivots with respect to its running direction and with respect to the direction of transport of the wafers. Advantageously, the separating device may be adjusted in a simple manner to the transport velocity of the wafer sheets. Thus, in case of a change in the transport velocity of the wafers, the separating device itself must only be pivoted, in order to adjust to the altered transport velocity of the wafers, while maintaining a constant rotating velocity of the blades.

To be able to coat wafer sheets having different widths as measured perpendicularly to the direction of transport with the installation according to the invention, the invention provides that the width of the coating roll is larger than the maximum width of the wafers.

In a further aspect of the invention, the opening of the coating reservoir directed toward the coating roll has a width corresponding to the width of the wafer sheets to be coated in such a way that the film of the spreading mass on the coating roll is preferably slightly narrower than the width of the wafer sheet. This prevents the coating of the wafers to the edges, especially in the case of spreading masses that are viscous to highly viscous at the temperatures of application. It thereby also prevents the running off of the still liquid spreading mass laterally from the wafers which, in turn, avoids soiling of the transport installation for the wafer elements and soiling of subsequent lateral guide elements.

In order to assure the presence of all times of a film of the spreading mass of constant width on the coating roll, in keeping with the invention, the width of the coating roll blade for taking off the spreading mass layer from the coating roll is larger than the width of the wafers. The blade thereby will always take off the entire spreading mass layer from the coating roll and deposit it onto the wafer sheets passing below, so that, downstream of the blade, no spreading mass residues remain on the surface of the coating roll.

To be able to coat wafers of different widths with a single application reservoir, the width of the opening of the reservoir directed toward the coating roll is adjustable. This may be effected, for example, by means of a strip mounted laterally on the reservoir, which strip is displaceable parallel to the axle or axis of the coating roll and which is equipped with a front limitation adjusted to the coating roll.

It may further be provided according to the invention that the separating device has blades movable transversely to the direction of transport of the wafer sheets, the blades being moved by a pneumatic piston transversely to the direction of transport of the wafer sheets. The blades may be lifted up after the cutting stroke, guided back above the path of the wafers without contacting them, and lowered into the cutting position. The blades may be arranged, for example, on the end of a piston rod of a compressed air cylinder, which is pivoted upwardly after each cutting stroke. Thus, after the return stroke, the blades are lowered into their cutting position outside the path of the wafer sheets, by virtue of the compressed air cylinder being pivoted into a horizontal position. Then, the next cutting stroke may be effected.

According to a further characteristic of the invention, guide rails or the like are provided laterally to the path of the wafer sheets, to laterally support the wafer sheets during the separation process. This prevents the lateral shifting of the wafer sheets during separation.

To summarize and amplify certain of the foregoing, the installation of the invention is an installation for coating of baked products with a viscous, edible spreading mass applied at a certain temperature of application, which viscous material is adhesive at the temperature of application. The coating installation comprises a transport installation for moving the baked products along a transport path in a transport direction, the transport installation having an upwardly facing side on which the baked products are carried. There is also a revolvable, generally cylindrical coating roll located above the transport installation. The coating roll has a bottommost point constituting a crest line, the coating roll also having a surface. The coating roll revolves in a certain direction of rotation. There is also a coating roll blade cooperating with the coating roll. An application reservoir cooperates with the coating roll and is located after the coating roll blade when considered with respect to the direction of rotation of the coating roll. The reservoir is fillable with the spreading mass. Part of the application reservoir faces in an upward direction away from the transport installation, and another part of the application reservoir faces in a downward direction toward the transport installation. A coating roll squeegee cooperates with the coating roll and with the application roll, the coating roll squeegee being disposed after the application roll, also when considered with respect to the direction of rotation of the coating roll. Thus, the application reservoir applies the spreading mass to the coating roll, the coating roll squeegee controls the thickness of the spreading mass on the coating roll, and the coating roll blade removes the spreading mass from the coating roll in the form of a layer, which layer of spreading mass is then deposited on the baked products transported by the transport installation.

The application reservoir has a forward limit disposed adjacent the coating roll and at a forwardmost point relative to the direction of rotation of the coating roll. The application reservoir has an opening directed toward the coating roll, which opening is defined by an edge. The edge of the opening rests tightly against the surface of the coating roll and forms a gap with the surface of the coating roll only at the forward limit of the coating roll. The coating roll squeegee which cooperates with the coating roll may seal the application reservoir in the upward direction.

Of course, the baked products to be coated are preferably wafer sheets, the wafer sheets being defined by edges. The separating device is for separating wafer sheets which have been connected with each other by the deposit of the spreading mass thereon. Each separating blade of the separating device has a cutting edge which is movable in a cutting edge path. The cutting edge path may be at least partially circular, the cutting edge moving at a certain circumferential velocity. The at least partially circular path, of course, has a diameter.

Each wafer sheet has a width to be coated, the width to be coated being taken in a direction transverse to the transport direction. The opening of the application reservoir directed toward the coating roll has a width parallel to the reservoir axle. The width of the opening of the application reservoir directed toward the coating roll corresponds to the width to be coated of the wafer sheets.

The transport installation defines a transport plane corresponding with the upwardly facing side of the transport installation.

It will of course be apparent that when the term "transverse" is used herein to discuss the disposition of a separating device, separating blades or the like with respect to the transport installation, the term does not necessarily mean the same as "perpendicular". That is, a "transverse" disposition or movement with respect to, for example, the coating roll segment of the transport installation will extend across the coating roll segment but perhaps at an incline to the transport direction, i.e., in a direction other than strictly perpendicular.

It will also be apparent that, when the term "oil" is used herein, the oil may be an edible oil.

Further advantages, arrangements, configurations and characteristics of the invention will become apparent from the description hereinafter, wherein the invention shall be explained in more detail with the aid of examples of embodiment represented in the drawings.

BRIEF DESCRIPTION OF THE DRAWINGS

FIG. 2 shows a top view of FIG. 1 at a reduced scale and with the application reservoir removed;

FIG. 3 shows a further form of embodiment in side elevation;

FIG. 4 shows a form of embodiment of a squeegee according to the invention;

FIG. 5 shows an application reservoir partially in cross section;

DETAILED DESCRIPTION

Figure 1:
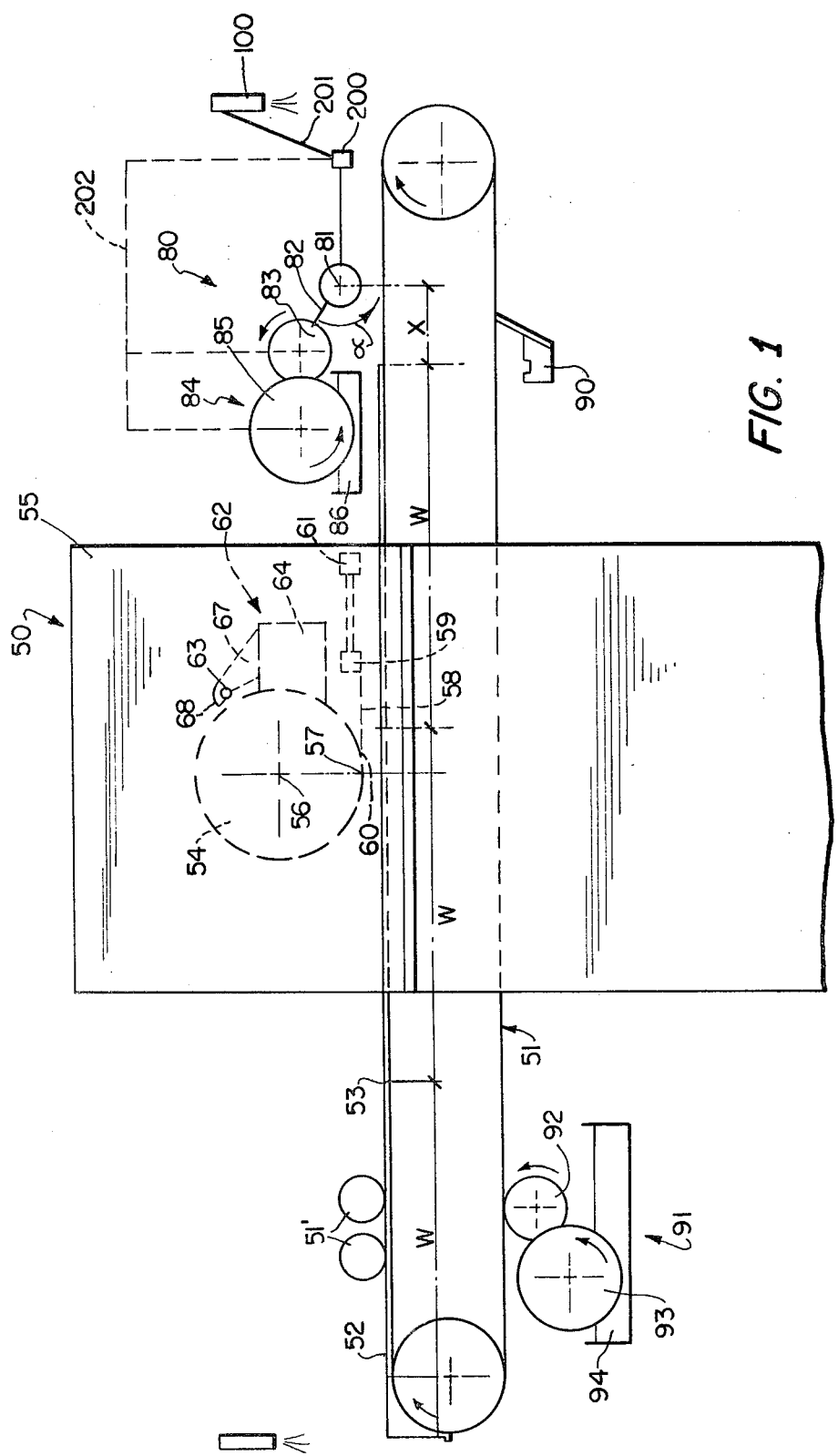
FIG. 1 shows a first form of embodiment of the invention in side elevation.

FIG. 1 shows one form of embodiment of coating installation 50. Coating installation 50 includes a horizontally arranged transport installation 51 upon which baked products in the form of wafer sheets 52 are moved under and past a generally cylindrical coating roll 54 while resting against each other with their leading edges 53. The coating roll 54 is supported laterally from the transport installation 51 on a support frame 55 and is disposed such that its rotating axle or axis 56 is perpendicular to the direction of transport of the wafer sheets 52. The coating roll 54 is located with its bottom crest line 57 (i.e., its bottommost point) close to the path of the wafer sheets. A coating roll blade 58 is arranged in the area of the bottom crest line 57, over the transport installation 51. Coating roll blade 58 is pivotable around an axle 59 parallel to the rotating axle or axis 56 of the coating roll 54 and in contact with the surface of the coating roll with its edge 60. The contact of the edge 60 of the cutting roll blade 58 is effected by a counterweight 61, fastened in the area of the rotating axle 59 on the side of the rotating axis 59 opposite to the edge 60. Above the coating roll blade 58 is an application reservoir 62 which pivots around an axle 63. Application reservoir 58 is mounted on frame 55. The axle 63 is parallel to the rotating axle 56 of the coating roll. The reservoir 62 is in the form of a trough open to the top and toward the coating roll, the sidewalls 64 of which are adapted to the curvature of the coating roll 54 on their front sides. The bottom 65 of the application reservoir 62 rests with its front edge 66 against the circumference of the coating roll 54 and seals the inside of the reservoir against the coating roll on the bottom of the application reservoir. The two lateral walls 64 of the application reservoir seal the inside of the reservoir against the coating roll 54. An arm 67 is fastened to each of the lateral walls 64 of the reservoir, the arms resting with their hook-like ends 68 on the axles 63 of the application reservoir.

As seen in FIG. 5, the bottom 65, the lateral walls 64 and the rear wall 69 of the reservoir are double, and together they form a jacket, filled with a liquid, such as, for example, oil. The rear wall 69 of the application reservoir 62 is provided on its inside with an oblique wall with respect to the bottom 65 so that, on the one hand, a large cavity is created in the jacket, wherein a heating element 70 is located to heat the content of the jacket of the reservoir and to maintain the temperature of both the trough-shaped inside 71 of the reservoir and also the spreading mass contained therein, On the other hand, an acute corner that would be difficult to clean is avoided.

A coating roll squeegee 72 directed toward the coating roll is arranged on the upper edge of the reservoir. The squeegee extends over the entire width of the reservoir 62 as measured parallel to the rotating axle 56 of the coating roll 54 and rests on the two lateral walls 64 of the reservoir. The squeegee 72 is in the form of a continuous strip with a trapezoid cross section, having at its lower end an edge 73 which determines the thickness of the spreading mass layer on the coating roll 54. Adjusting screws 72a are fastened to both ends of the squeegee, which are located above the rear wall of the application reservoir rotatingly but not displaceably. By rotating the adjusting screws, the coating roll squeegee 72 may be displaced along the lateral walls 64 (specifically, along their upper edges) to and from the coating roll. The squeegee 72 may be equipped on the inside with heating means 72b, i.e., with a heating element, or with connections on its lateral ends for oil lines or the like. In the latter instance, the squeegee is also provided with a passage bore so that a heated liquid may flow through the squeegee. The squeegee 72 may also include a hollow housing traversed by a temperature transfer liquid and equipped in its area coordinated with the coating roll with an edge 73 which determines the thickness of the layer of spreading mass (FIG. 5).

According to a further embodiment, a coating roll squeegee 74 may be arranged above the application reservoir 62, spaced therefrom, and may have a strip mounted parallel to the rotating axle 56 of the coating roll. Coating roll squeegee 74 is equipped in its area facing the coating roll with a wedge-shaped edge 75, oriented in the direction of rotation and determining the thickness of the spreading mass on the surface of the coating roll. The wedge shaped edge 75 and the squeegee 74 together form, with the surface of the coating roll, a gap 76 which narrows in the direction of rotation of the coating roll (FIG. 4).

The spreading mass to be processed in the installation of the invention, for example, caramel, is supplied from a storage reservoir through a possibly heated line (not shown) to the application reservoir 62. In the reservoir 62, the spreading mass is heated and applied to the coating roll through the opening directed toward the coating roll, while the desired layer thickness is achieved with the aid of the squeegee. The spreading mass is heated on the coating roll 54 to the ideal spreading temperature. For this purpose, the coating roll is equipped with a jacket through which oil or water flows, whereby the desired temperature on the surface of the coating roll is achieved. Alternatively, electric heating elements may be placed in the coating roll. By virtue of the long circumferential contact of the spreading mass with the surface of the coating roll from the reservoir 62 to the take-off blade 58, the spreading mass is heated to the temperature necessary for its application to the wafer sheets. The ideal temperature depends on the particular type of spreading mass to be processed and is conveniently chosen so that the spreading mass just establishes a bond with the wafer upon which it is deposited, but is still removable from the roll surface in the form of a layer. In the processing of certain caramel as the spreading mass, the ideal temperature may be between 30° C. and 110° C. With other caramel masses, the temperature is between 30° C. and 40° C. In the case of still other caramel masses, the ideal spreading temperature is between 90° C. and 110° C., with the spreading temperature being a function of the composition of each caramel mass. Further, a mass called tumon in Spanish may be used as the spreading mass. It is similar to Turkish delight.

Following the removal of the spreading mass by the coating roll blade 58 from the coating roll 54, the layer of the spreading mass is deposited onto the wafer sheets 52 located underneath the coating roll 54 on the transport installation 51. The front edges 53 of these wafer sheets abut against each other. The spreading mass adheres to the surface of the wafer sheets 52 and cools slowly, while the caramel mass solidifies as a single caramel layer on a group of wafer sheets. Thus, the successive wafer sheets are joined together by the slowly solidifying caramel layer.

The deposition of the spreading mass layer on the surface of the wafers may be carried out according to one form of embodiment of the invention by a process in which the layer of the spreading mass on the coating roll in the transfer area (i.e., in the area of the bottom crest 57 of the coating roll 54) moves in the same direction as the wafers 52 on the transport conveyor 52 (FIG. 1).

Figure 6:
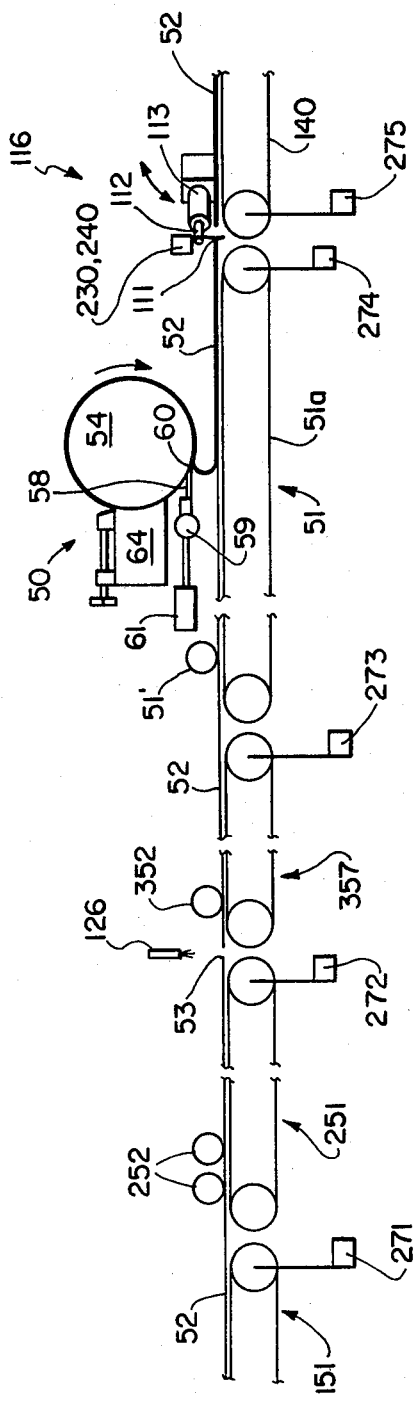
FIG. 6 shows a further form of embodiment of the invention in side elevation.

According to a further form of embodiment of the invention, the take-off or coating roll blade 58 and the application reservoir 62 are arranged in front of the coating roll 54, as viewed in the direction of transport of the wafer sheets. The coating roll 54 rotates in this form of embodiment against the direction of the transport installation, so that the layer of the spreading mass moves with the bottom side of the coating roll in a direction opposite to that of the wafer sheets. In this form of embodiment, the film or layer of the spreading mass is reversed by 180° in the transfer area, the film being deposited onto the wafer sheets and contacting the wafer sheets with its side previously adhering to the surface of the coating roll (FIG. 6).

A separating device 80 is arranged over the transport installation 51 (specifically, over the upper strand of the conveyor belt constituting part of the transport installation) in the direction of transport (FIGS. 1 and 2). This separating device has a cutting bar 82 rotatable around a horizontal axle 81. The cutting bar is provided with a cutting edge 83 arranged perpendicularly to the direction of transport. An axle 81 of the cutting bar is arranged a distance above the path of the wafer sheet in a separating position (i.e., in a position where it is located over the upper strand conveyor belt of the transport installation 51 and vertically under the axle 81) so that the cutting bar may extend through the spreading mass layer on the wafer sheet in the downward direction.

An oiling apparatus 84 is arranged parallel to the cutting bar 82. It consists of a feed roll 85 parallel to the cutting bar, which dips with its bottom side into an oil bath 86, and an applicator roll 87 in circumferential contact with the feed roll 85. The applicator roll 87 is spaced from the rotating axle 81 of the cutting bar 82 only so far that the cutting edge 83 is able to contact the surface of the applicator roll, and to penetrate it when the cutting bar is rotated.

The cutting bar 82 is equipped with its own drive, which is actuated during each separation process. By the actuation of the drive, the cutting bar is moved from its rest position, wherein its edge 83 is in contact with the applicator roll 87, into the separating position in which it cooperates with the transverse edge of a wafer. The two rolls of the oiling apparatus 84 are moved also by the motion of the cutting bar. The cutting bar 82 moves from its rest position into the separating position through an angle α. Following its motion through this angle, the edge 83 of the cutting bar impinges on the front edges of two wafer sheets, abutting against each other and moving under the cutting bar, and cuts the layer of the spreading mass on the wafer sheets. The cutting edge 83 then pushes the separated wafer slightly in the direction of transport. For this reason, the circumferential velocity of the edge of the cutting bar is slightly higher than the transport velocity of the wafer sheets, with the ratio F of the circumferential velocity of the blade to the wafer transport velocity being equal to approximately 1.1 to 1 (i.e., 1.1:1).

It is, however, also possible to use the blade to cut both the wafer sheet and the film of spreading mass. This is appropriate, for example, when stacking is not immediately effected following the application of the mass; but rather, when it is effected in a different manner. In this different stacking method, there will be an endless band of wafer sheets abutting against each other and a layer of spreading mass thereon. Another layer of wafer sheets, which are in contact with each other, is deposited on the first band, the front edges of the wafer sheets being offset with respect to each other in different positions. The wafer blocks are cut from the endless band of sections created in this manner, with the size of the blocks being freely adjustable. The blocks of wafers may consist of multiple layers, whereby a layer of wafers is placed on each layer of the spreading mass and the entire band of wafer blocks is cut by the blade.

A preferably heatable squeegee 90 is arranged at the bottom side of the transport installation 51, engaging the surface of the lower strand of the transport installation 51. The squeegee 90 removes all of the spreading mass particles and the like remaining on the transport installation 51.

Underneath of the front end of the transport installation 51, an oiling apparatus 91 is arranged for the transport installation 51. By means of the oiling apparatus 91, the wafer conveyor belt of the transport installation 51 is provided with a film of oil on its side in contact with the wafer sheets 53 with the aid of a foam rubber roll 92 in circumferential contact with a steel roll 93.

The steel roll 93 dips with its bottom side in an oil bath in an oil reservoir 94 and carries an oil film over its surface to the foam rubber applicator roll 92 which, in turn, is then applied to the conveyor belt. Both rolls of the oiling apparatus are driven by the lower strans of the conveyor belt of the transport installation 51 itself, which entrains the foam rubber applicator roll 92, thereby rotating both the foam rubber applicator roll and the feed roll 91. It is, however, possible to couple the foam rubber applicator roll with the drive of the transport installation 51 (FIG. 1).

In order to better control the thickness of the oil film on the wafer conveyor belt of the transport installation 51, the application roll 92 may be driven directly. Its circumferential velocity with respect to the transport installation 51 may thereby be altered.

Figure 7:
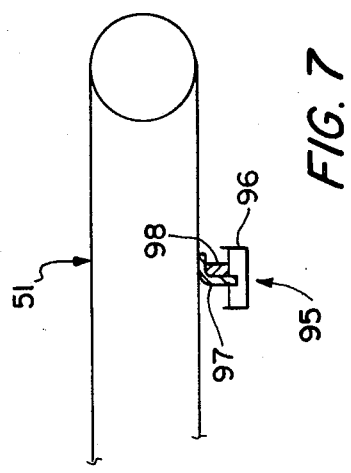
FIG. 7 shows an oiling device for a conveyor in cross section.
Figure 8:
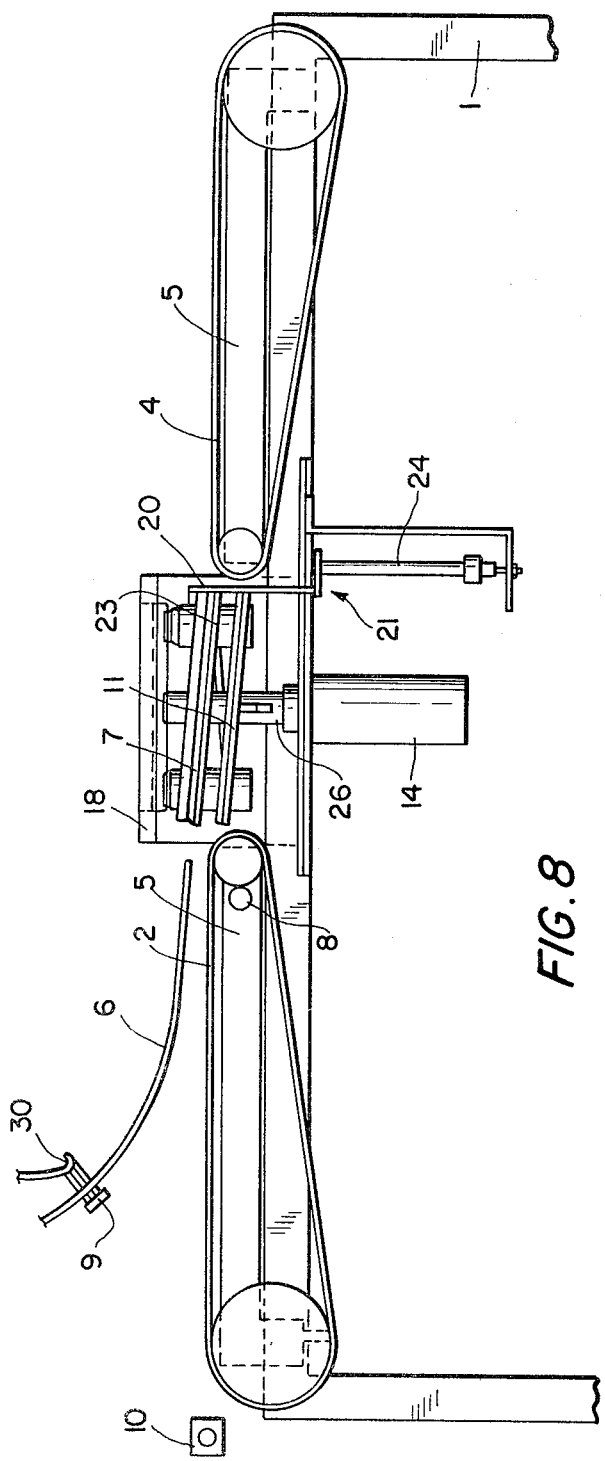
FIG. 8 shows a block former in a side elevation.

In place of the oiling apparatus 91, an oiling apparatus 95 may be provided. Oiling apparatus 95 includes an oil-filled reservoir 96 and a transfer element 97, wherein the transfer element 97 may consist of a strip of felt extending with one end into the oil in the reservoir 96, while its other end is in contact with the bottom side of the conveyor belt of the transport installation 51. The transfer element 97 is fastened to a rail 98 arranged parallel to the width of the lower strand of the transport installation 51, the rail 98 preventing the entrainment of the transfer element by the transport installation 51 and also ensuring the contact of the transfer element with the conveyor belt of the transport installation 51 (FIG. 7).

According to a further form of embodiment of the invention, the separating device 109, for the coated wafers which are in contact with each other with their front edges, has separating blades 110 moving transversely to the transport direction of the wafer sheets. The separating blades move at a velocity that is a multiple of that of the wafer sheets. The track or path of the separating blades is inclined to the direction of transport of the wafer sheets, with the inclination to the direction of transport of the wafer sheets being determined by the transport velocity of the wafer sheets and the revolving velocity of the blades (FIG. 3).

According to a further form of embodiment of the invention, separating blades 111 also move transversely to the direction of transport of the wafer blades. They are mounted on the piston rod 112 of a compressed air cylinder 113, arranged on the side of the transport path of the wafers. To cut the wafer sheets or their coating, a piston rod 112 of a compressed air cylinder 113 is moved in a plane parallel to the transport path of the wafers 52 in a cutting stroke, with the cutting blade 111 extending downward from the piston rod 112 and sliding between the front edges of adjacent wafers which are joined together by their coating. As soon as the cutting blade 111 later moves laterally out of the path of the wafers, it is engaged by a cleaning and/or an oiling apparatus whereby all still adhering residues of the spreading mass are removed. After cutting, the compressed air cylinder 113 is pivoted upwards and the cutting blade 111 returns into its initial position, via a return stroke of the piston rod 112, without damaging the coated sheet of wafers. The compressed air cylinder is then lowered and is thereby again arranged in a plane parallel to the transport path of the wafer sheets (FIG. 6).

According to another, previously mentioned embodiment, the separating blades 110 are mounted on an endless chain 115 revolving transversely to the transport direction of the wafer sheets 52. The chain is straight in the cutting area, and each strand of the chain is disposed in a plane parallel to the transport path of the wafers, slightly above the transport path. The blades 110 protruding from the chain 115 penetrate the transport path or plane of the wafers. These blades run parallel to the front edges of the wafer sheets. The chain as a whole may revolve in a plane that is perpendicular to the transport plane of the wafers, but which is also inclined with respect to the direction of transport of the wafers. The inclination of this plane to the direction of transport is adjustable by pivoting the separating device so that the separating device may be adjusted to different transport velocities of the wafers (FIG. 3).

Figure 11:
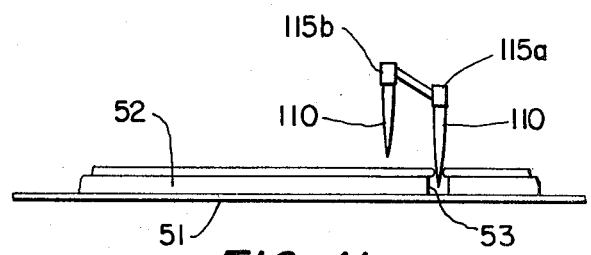
FIG. 11 is a schematic side elevation showing how the revolving chain of one form of separating device may be disposed at an angle to the transport plane.
Figure 12:
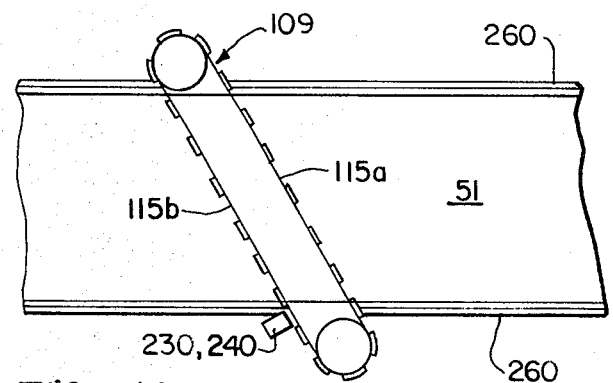
FIG. 12 is a schematic plan view showing how the revolving chain may be disposed at an inclination with respect to the direction of transport of the wafers.

According to a certain embodiment of the invention, the revolving chain is arranged above the transport installation for the wafers, with the revolving plane of the chain being inclined at a very flat angle to the transport path of the wafer sheets. The lower strand of the chain runs obliquely to the direction of transport of the wafer sheets, but runs in a plane parallel to the transport plane. The upper strand is removed from the path of the wafers only far enough so that the blades arranged above the transport path return after the cutting process at a slight distance above the coated wafer sheets. (FIGS. 11 & 12)

Figure 13:
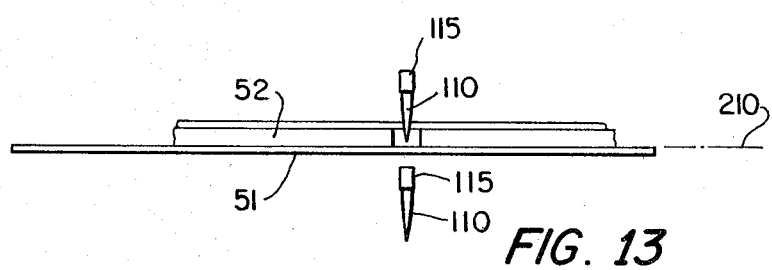
FIG. 13 is a schematic side elevation showing an embodiment wherein the upper strand of the revolving chain of the separating device effects separation while the lower strand passes underneath the transport plane.

According to a further form of embodiment of the invention, the revolving chain is arranged so that the separation of successive wafer sheets by the blades takes place at the upper strand of the chain, while the blades return, after cutting, by passing underneath the transport path of the wafer sheets. (FIG. 13)

Figure 14:
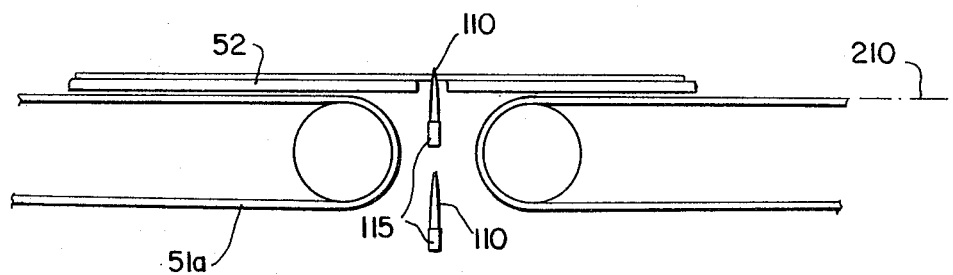
FIG. 14 shows in schematic side elevation a variant in which the entire revolving chain runs underneath the transport plane of the wafers.

A further variant of the invention provides that the separating device is arranged following the transport installation 51, specifically, the coating roll segment 51a, wherein the blades mounted perpendicularly to the transport path are fastened to the upper loop of a revolving chain and the entire chain runs underneath the transport path of the wafers. (FIG. 14)

In the case of blades 110, 111 moving transversely to the transport direction of the wafer sheets, a cleaning or an oiling apparatus is provided outside the transport path of the wafers. Conveniently, the blades pass through the cleaning station immediately after the cutting process, while the oiling apparatus is traversed immediately prior to the cutting process. Elastically yielding squeegees are provided for the cleaning of the blade edges. They are placed in the path of the blades and are displaced from said path, whereby particles adhering to the edges are removed. The oiling apparatus for the blades may be formed by a transfer element dipping into a supply of oil, said transfer element transferring oil to a blade engaging it when the blade is moving through the oiling apparatus.

Figure 18:
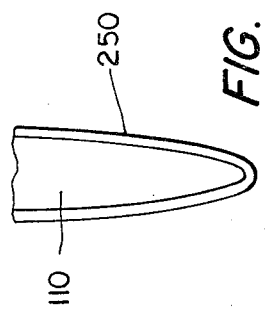
FIG. 18 is a fragmentary elevational view of a separating blade showing schematically, in exaggerated scale, a Teflon coating for the blade.

To prevent the adhering of the spreading mass to the blades, they are coated according to another alternative with Teflon or the like. (FIG. 18)

In the case of separating blades moving transversely to the direction of transport, a guide rail is placed laterally of the transport rail of the wafers, against which the coated wafer sheets abut during the cutting process. The individual blades are appropriately arranged perpendicularly to the transport direction of the wafers and thus in the direction of the front edges of successive wafers.

To ensure that the separation of successive coated wafer sheets takes place exactly at their front edges abutting against each other, a light barrier 100 is placed according to one form of the embodiment of the invention at the end of the transport installation underneath the coating roll 54. The distance of the light barrier 100 from the axle 81 of the cutting bar is chosen so that the light barrier 100, when it detects the leading edge of a coated wafer sheet, actuates the drive of the cutting bar. Thus, during the further transport of the wafer sheet by the transport installation 51, the rear edge of this wafer sheet will be located exactly under the axle 81, i.e., in the position of separation, when the blade 83 of the cutting bar 82 arrives at the same point. The distance of the light barrier 100 from the rotating axle 81 of the cutting bar is equal to the length of one wafer measured in the transport direction, less the path X covered by the wafer sheet during the movement of the cutting bar from its rest position into the separating position. This path X is in the case of a rotating cutting bar of the order of magnitude of the angular path covered by the blade. The path X is given by the following formula:

$$X = (D\pi/360)\alpha F$$

wherein D is the diameter of the circular path covered by the blade, $\alpha$ the angle of the blade between the rest and the cutting position, and F the ratio of the circumferential velocity of the blade to that of the transport belt for the wafer sheets.

In another form of embodiment of the invention, a light barrier 120, 120' is arranged both at the start of a coating roll segment 51a of the transport installation 51 and at its other end, with each of said light barriers detecting the presence of a wafer sheet. According to a variant, both of the light barriers are used to control the time of the actuation of the drive of the cutting bar 82 or of the revolving chains 115 (i.e., the start of the cutting blades moving transversely to the direction of transport of the wafers). The separating device 80, 109, 116 is actuated when both light barriers signal the presence of the front edge of a wafer. The distance of the light barriers may correspond to an integer multiple of the length of the wafers in the direction of transport.

In another form of embodiment of the invention, the separating device is actuated only by the light barrier 100 arranged at the end of the coating roll segment 51a of the transport installation 51. In this variant, the transport installation is actuated even if the light barrier located at the onset of the coating roll segment 51a does not signal a leading edge of a wafer sheet. Should the light barrier located at the start of the coating roll segment 51a signal no front edge of a wafer several times in succession, however, the conveyor belt following the separating device in sequence will be lowered to remove defective sheets of wafers.

In order to ensure that the light barrier located in front of the coating roll is able to reliably detect the leading edge 53 of the wafer 52, the wafer sheets are guided laterally by guiding means 130. In these guiding means, a wedge 131 is provided. The wedge protrudes into the path of the wafers and displaces them laterally, thereby making it possible for a sensor, for example, a light barrier, to recognize the front edge of a wafer sheet.

According to a further form of embodiment of the invention, the segment of the transport installation 51 moving the wafers below and past the coating roll 54, i.e., the coating roll segment 51a, is preceded by three further segments 151, 251, 351, each being embodied by a conveyor belt. A light barrier 126 is arranged between the second conveyor belt 251 and the third conveyor belt 351, as viewed in the direction of transport. The first conveyor belt 151 and the third conveyor belt 351 are driven at a higher velocity than both the second conveyor belt 251 and also the conveyor belt of the coating roll segment. By these means, the wafers moved by the conveyor belts are slowed down on the second conveyor belt 251, thereby joined together with their front edges, and reaccelerated on the third conveyor belt 351. Thus, the wafers 52 are again separated in the transfer area between the second belt 251 and the third belt 351 so that they may be detected at their front edges 53 of the light barrier 126, which may also be located in the center of the transport plane. The more rapidly traveling third conveyor belt 351 transfers the wafers 52 to the conveyor belt 51 of the first segment which brakes them by running slower than the preceding belt. Thus, the gap between successive wafers is closed and the wafer sheets are moved, with their front edges abutting against each other, underneath the coating roll 54. In order to ensure that the wafers are actually slowed by the conveyor belt involved, pressure rolls 252, 51' are arranged above the conveyor 251. A pressure roll 352 may also be arranged above the more rapidly running conveyor belt 351 (FIG. 6).

The wafer sheets coated in the installation according to the invention and separated from each other are transferred to a more rapidly running conveyor belt 140 following the separating device (i.e., a "transport segment" of the transport installation), which draws the individual wafer sheets further apart. This more rapidly running conveyor belt 140 may be in the form of a feeder belt 2 of a subsequent stacking apparatus 3, representing a so-called block former or block forming device.

A block former of this type includes a stand 1, wherein a feeder belt 2, a stacking device 3 and a discharge belt 4 are arranged. Each of the belts 2 and 4 has a frame 5 by which they are supported on the stand 1. Above the feeder belt 2, a slide 6 for uncoated wafer cover sheets is located. A calibrating roll (not shown) for the wafer block may be disposed over the discharge belt 4. The slide 6 terminates over the feeder belt directly in front of the stacking apparatus 3. A barrier 9 is located over the slide 6. The barrier is pivotable around a horizontal axle, and it may be lifted from the slide or lowered with respect to said slide 6. It serves to prevent the further sliding of a cover sheet resting on the slide. The barrier may also be composed of a row of bristles that may be removed from the slide path of the wafer sheet. The barrier may be lifted off or lowered at right angles with respect to the slide. The slide 6 is inclined with respect to the horizontal transport plane of the feeder belt 2, so that when the barrier or stop is removed, the wafer resting on the slide 6 is moved only by the force of gravity along the slide 6 to the stacking apparatus 3.

The bottom of the slide 6 may be equipped with longitudinal slots so that the cover sheet slides merely on the ridges remaining between the longitudinal slots. The barrier 9 in the form of a row of bristles may be arranged under the slide so that the bristles protrude through the bottom of the slide from below to engage a baffle plate 30 located over the slide 6 when in a raised position. The baffle plate 30 is inclined toward the slide 6 and equipped in the area of the row of bristles with a curvature leading away from the slide, so that the distance between the baffle plate 30 and the slide 6 is the shortest in the area of the row of bristles.

A cover sheet sliding on the slide 6 toward the barrier 9 is halted very gently by the barrier in the form of a row of bristles, as the sheet passes partially between the baffle 30 and the row of bristles and is thereby slowed. If the row of bristles is located over the slide 9 and raisable from it, the cover sheet will be gently trapped between the bottom of the slide 6 and the row of bristles.

The release of the uncoated cover sheet by, for example, lowering the row of bristles, is controlled by means of a light barrier located above the feeder belt 2 and by an adjustable counter, upon which the number of wafer sheets to be contained in a wafer block may be set.

A coating installation according to the invention is arranged in front of the feeder belt 2 in the transport direction. The coated wafer sheets emerge already separated from this coating installation on a conveyor belt. This conveyor belt transfers the wafer sheets, coated with caramel for example, into the area of the light barrier 10 for the feeder belt 2, which belt is running at a considerably higher velocity. Thus, the coated wafers are separated and supplied to the stacking apparatus 3 individually in a spaced-apart condition. The difference between the transport velocity of the wafers, on the one hand, and the transport velocity in the stacking apparatus, on the other, provides the period of time necessary for the stacking process itself.

The stacking apparatus 3 consists of two helical tracks 11, 11' following the feeder belt 2. The helical tracks face each other and rotate around vertical axles which seize the wafer sheets between them. The helical tracks 11, 11' consist of spring steel wire bent along a helical line. The tracks 11, 11' run in opposing directions and are wound in their rotating directions. The helical track 11', disposed to the right when viewed in the transport direction, contains windings that rise counterclockwise, and the helical track 11' runs around its vertical axle 12' in the clockwise direction. In the case of the opposing helical track 11, to the left, the windings rise clockwise and the left-hand track 11 runs around an axle 12 that is parallel to the axle 12' of the right-hand track 11' in the counterclockwise direction. The distance between the helical tracks 11, 11' and their axles 12, 12' (i.e., their radius) corresponds to approximately one-half of the length of a wafer sheet 7 as viewed in the direction of transport. Each of the tracks 11, 11' has only two windings and is mounted by means of a diametrical arm 29, 29' on one of the shafts 26, 26' forming the rotating axle 12, 12'. The arm 29, 29' and one-half to one full winding of each track 11, 11' is located underneath the transport plane of the feeder belt 2. When at rest, the tracks 11, 11' extend into the transport plane of the feeder belt 2 outside the stacking area proper and essentially in the plane determined by the rotating axles 12, 12' of the tracks 11, 11'. The distance between the rotating axles 12, 12' of the two tracks 11, 11' corresponds to the width of a wafer sheet 7, increased by the diameter of a shaft 26. These conditions result in optimum support of the brittle and fragile wafer sheet 7.

The wafer sheets arriving from the feeder belt 2 between the windings of the helical tracks 11, 11' are raised by the helical tracks 11, 11' rotating in opposing directions from a first plane wherein they are moved by the feeder belt, to a second plane from which the finished wafer block is removed. That is, the windings of the helical tracks synchronously raise a wafer resting on the two tracks 11, 11' from the first plane to the second, wherein the frictional forces applied to the wafers by the rotation of the tracks 11, 11' produce a resultant in the direction of transport that would normally move the wafer in the transport direction. To prevent this forward motion of individual wafer sheets prior to the completion of the wafer block, a stop 21 having a plurality of fingers 20 mounted on a plate 30 is located immediately following the tracks 11, 11'. The wafer sheets 7 slide along the stop 21 during their rise on the tracks 11, 11'. When the desired number of wafers set on the counter is present in the stacking apparatus 3, i.e., when the last wafer sheet for a given stack is still in the first plane of the stacking apparatus 3, the first rotation of the tracks 11, 11' is actuated when the first coated wafer of the next block passes the light barrier 10. At this time, the last wafer of the previously formed block is added to the block from below. Following the completion of this first rotation, the stop 21 is lowered and a second rotation of the tracks 11, 11' is actuated without interruption.

The wafer block is thereby released and is transferred from the tracks 11, 11' to the discharge belt 4, while the stop 21 returns to its first position wherein it remains with its upper edge underneath the transport plane of the discharge belt 4. As soon as the tracks 11, 11' are halted after their second rotation, the cover sheet in the slide 6 is released and slides onto the tracks 11, 11' in the second plane. Simultaneously, the first coated sheet is pushed by the feeder belt 2 into the first plane of the tracks 11, 11'. When the second coated wafer sheet passes the light barrier 10, the stop 21 moves into its upper, second position and the first coated wafer is applied by the tracks 11, 11' to the cover sheet from below.

Following the halting of the tracks 11, 11', the second coated wafer sheet of the wafer block enters the lower windings of the tracks 11, 11'. The second coated wafer sheet is raised as soon as the third coated wafer passes the light barrier 10. The third wafer sheet is added to the already-raised part of the wafer block to be formed, when the fourth and last coated and last wafer of a wafer block containing five wafer sheets passes the light barrier 10. This last wafer sheet enters the lower windings of the tracks 11, 11' following the halting of the tracks, i.e., after the application of the third coated wafer sheet, and is raised by the tracks 11, 11', as described hereinabove, upon the passing of the first coated wafer of the next wafer block.

The installation according to the invention prevents the soiling of the installation itself, of a block former following it, and of the subsequent wire cutters, which cut the blocks into small individual pieces, such as sections. This is because, during the application of the spreading mass, the wafer sheets are covered only with a layer that is slightly narrower than the width of the wafer sheet transverse to the direction of transport. Thus, the longitudinal edges of the wafer sheets in the direction of transport are kept free of the spreading mass. Soiling of parts is also prevented because, during the separation of the coated wafers by means of the separating device according to the invention, the front edges in particular of the layer of spreading mass are provided with an oil film, which prevents the adhesion of wafers which again come into contact with each other. This also prevents adhesion of spreading mass particles to the stops of the block former or the wire cutters. As an additional safety measure, in order to prevent the soiling of individual parts of subsequent installations by caramel coating masses, the conveyor belts of the block formers are also coated with a film of oil in a manner similar to the conveyor belt 51 of the coating roll segment, and that the helical tracks of the stacking apparatus, together with the elements moving the blocks through the wire cutters are also coated with oil in keeping with the invention.

By means of the oiling according to the invention of all of the elements and devices contacting the front edges of the wafer sheets during the production and processing of coated wafers, such as, for example, stops, helical tracks, wire cutters and the like, together with the transport installations upon which the wafer sheets and the wafer blocks are resting, the spreading mass, for example, caramel, is prevented from adhering to any of the transport elements.

Figure 10:
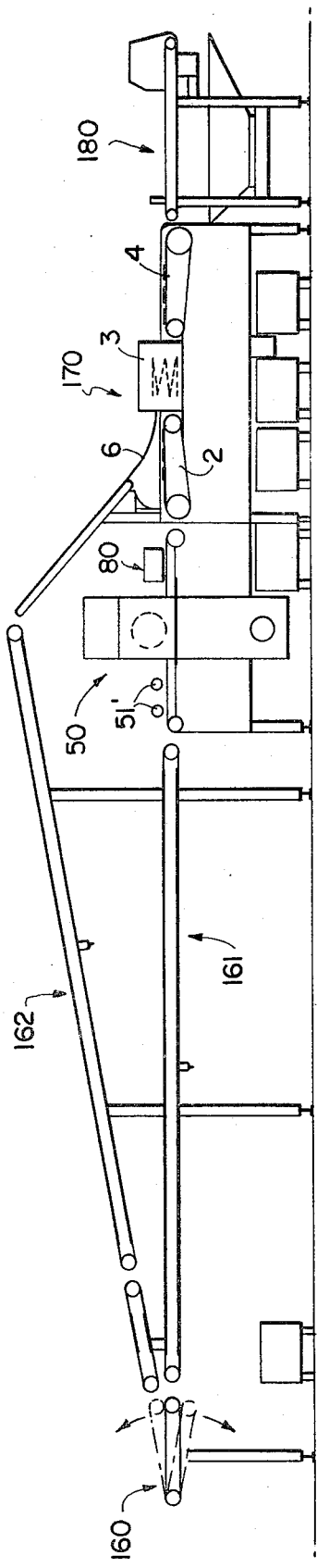
FIG. 10 shows, in side elevation, an installation which includes a coating apparatus, a subsequent block former and a subsequent cutting device.

FIG. 10 shows an overall installation for the production of small, filled wafer bars, made from wafer blocks by division. The wafer sheets coming from the wafer oven are transported by way of a turntable 160 and a subsequent lower conveyor belt 161 to an installation 50 for the coating of the water sheets with a spreading mass. The coated wafer sheets, which leave the coating installation 50 individually, are transported to a block former 170, wherein they are moved by the feeder belt 2 of the block former to the stacking apparatus 3. The cover sheets for the wafer blocks are transported by a transport installation 162, located above the transport installation 161, onto which the wafer sheets are placed by means of the turntable 160 in its upper position. Upper transport installation 162 transports the uncoated cover sheets to the slide 6 over the coated wafers. The uncoated wafer sheets are placed as the cover sheets on the coated wafers in the stacking apparatus 3. The finished wafer blocks are transferred from the wafer block former 170 by means of the discharge belt 4 to a subsequent cutting device 180, wherein the wafer blocks are cut into bars during their transport through the cutting device 180.

Returning to FIG. 5, the application reservoir 62 has an upper limit 280 at the top of the application reservoir, upper limit 80 being disposed adjacent the coating roll and at a forwardmost point relative to the direction of rotation of the coating roll. The application reservoir has an opening 281 directed toward the coating roll which opening is defined by an edge 66. The edge of the opening rests tightly against the surface of the coating roll and forms a gap 282 with the surface of the coating roll only at the upper limit 280 of the coating roll.

Returning to FIG. 1, the separating blade or, more specifically, the support or element which holds the separating blade 82 has its own drive which is schematically indicated by reference character 200. Drive 200 is actuable by a light barrier, such as light barrier 100, line 201 indicating a connection between the light barrier 100 and the drive 200. The oil applicator roll and feed roll 85, 84 may freely rotate and be moved merely by contact with the driven separating blade. Alternatively, the oil applicator roll and feed roll may be connected with the drive of the separating blade. This is indicated schematically by phantom lines designated by reference character 202 in FIG. 1.

It was previously mentioned that, where the separating device includes a revolving chain 115, the chain may be arranged above the transport installation for the wafers, with the revolving plane of the chain being inclined at a very flat angle to the transport plane of the wafer sheets. This is shown in FIG. 11. It was also indicated that the lower strand of the chain runs obliquely to the direction of transport of the wafer sheets. This is shown in FIG. 12. FIGS. 11 and 12 also show how, as previously indicated, the upper strand is removed from the path of the wafers only far enough that the blades which are returning after the cutting process are at a slight distance above the coated wafer sheets.

It was previously indicated that a further form of embodiment of the invention utilizes a revolving chain arranged so that the separation of successive wafer sheets by the blade takes place at the upper strand of the chain while the blades which return after completing the cutting process then pass underneath the transport plane of the wafer sheets. This is shown in FIG. 13 where reference character 210 designates the transport plane as well as the transport path for the wafer sheets.

It was previously mentioned that, according to another variant of the invention, the separating device is disposed at a point following the transport installation 51 (specifically, the coating roll segment 51a thereof) with the blades extending upwardly and the entire chain running underneath the transport path and transport plane of the wafers. This is shown in FIG. 14, where reference character 210 again indicates the transport plane and transport path.

It was also previously mentioned that a cleaning and-/or oiling apparatus may be provided outside the transport path for the wafers in the case of blades 110, 111 which move transversely to the transport direction of the wafer sheets. This cleaning and/or oiling apparatus is shown schematically and designated by reference characters 230, 240 in FIGS. 6 and 12.

Figure 16:
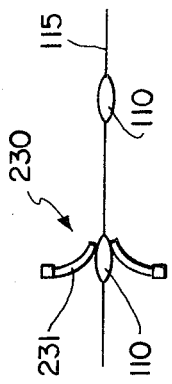
FIGS. 15 and 16 show in schematic fragmentary plan view a cleaning device for the separating blades.
Figure 15:
Figure 9:
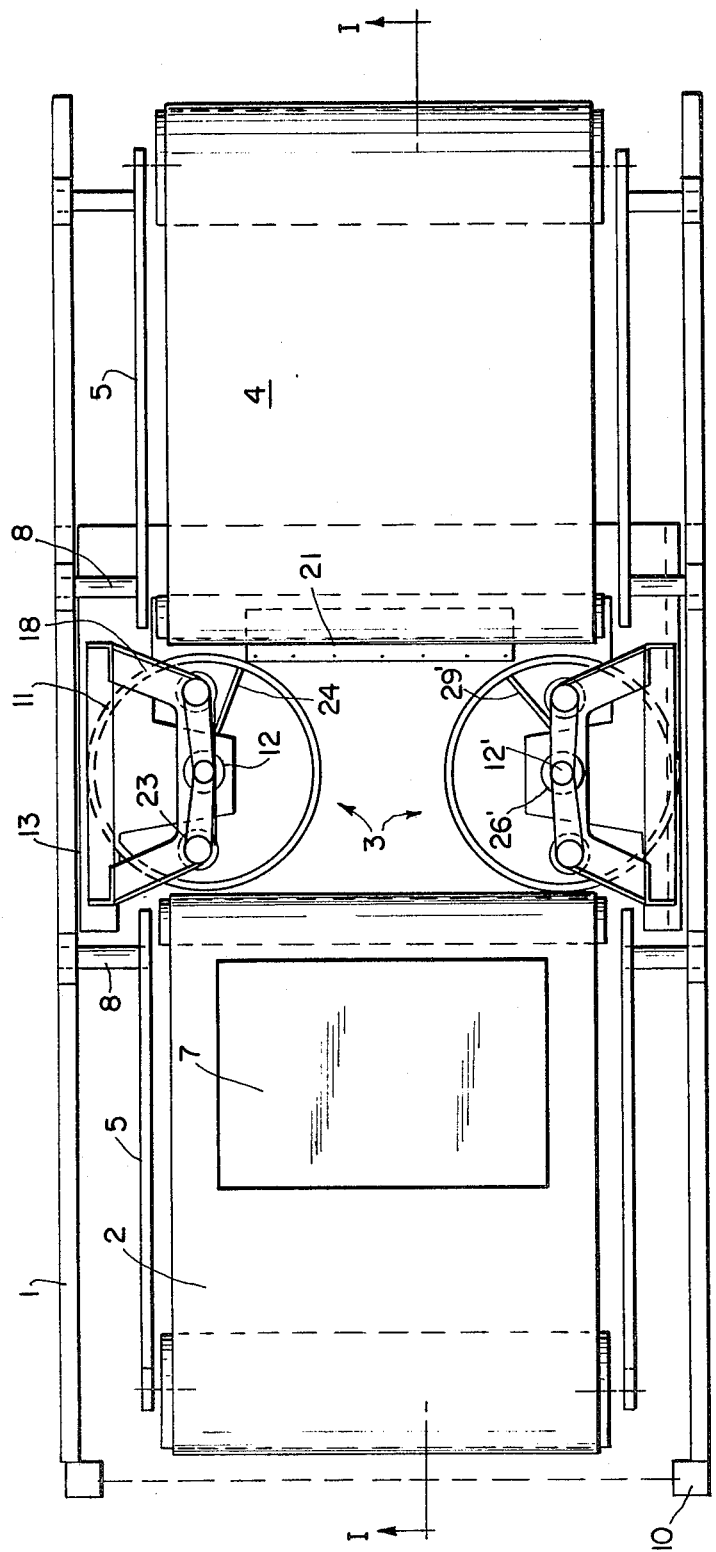
FIG. 9 shows a block former in a plan view.

Also, a more detailed schematic view of a cleaning apparatus 230 is shown in FIGS. 15 and 16, the cleaning apparatus including, as previously indicated, elastically yielding squeegees 231 provided for the cleaning of the edges of blades 110. FIG. 16 shows how elastically yielding squeegees 231 change their position upon being contacted by blades 110.

Figure 17:
FIG. 17 shows in schematic fragmentary side elevation an oiling device for the separating blades.

FIG. 17 shows a more detailed schematic of the oiling apparatus 240 for the blades 110. Oiling apparatus 240 includes a transfer element 241 dipping into a supply of oil 242 to transfer oil to the blade upon engagement with the blade, as previously indicated.

As also previously indicated, the blades 110 may be coated with Teflon to avoid the adherence of spreading mass thereto. A Teflon coating 250 is shown in exaggerated form for illustrative purposes in FIG. 18.

It was also previously indicated that, where the separating blades move transversely to the direction of transport, one or more guide rails is placed laterally of the transport installation, against which guide rail or rails the coated wafer sheets abut during the cutting process. Such guide rails are shown and designated by reference character 260 in FIG. 12.

The corners or corner areas of the wafers have previously been mentioned. These corners are, of course, formed by the edges of the wafers. In FIG. 2, a corner of a wafer sheet is designated by reference character 220. This corner is formed by transverse edge 221 of the wafer sheet and edge 222, the latter being parallel to the direction of transport.

Various ways of actuating the separating device in response to the presence of wafers at certain points of the overall transport installation have previously been discussed. In particular, there is a means for actuating the separating device upon the simultaneous indication of the presence of a wafer sheet edge by both a front light barrier located in front of the coating roll segment of the transport installation and a rear light barrier located at the downstream end of the coating roll segment. Alternatively, there may be means for actuating the separating device only when the presence of a wafer sheet edge is indicated by the front light barrier. As yet another alternative, the transport installation may include a separating point at which the separating device is located, the wafer sheets being in a separating position when at the separating point and the actuation is via a means for actuating the separating device by the front edge of the wafer sheet when the wafer sheet is in the separating position. Of course, a part of all the actuating means will be the connection of the light barrier with the drive for the separating device. See reference character 202.

It was previously indicated that certain of the segments of the transport installation were driven at certain velocities. It will, of course, be apparent in this regard that the segments have drives. In this regard, FIG. 6 shows the drives schematically. There is a drive 271 for the first conveyor belt or segment 151, a drive 272 for the second conveyor belt or segment 251, a drive 273 for the third conveyor belt or segment 351, a drive 274 for the coating roll conveyor belt or segment 51a, and a drive 275 for the transport conveyor belt or segment 140. It will, of course, be apparent that these various drives 271–275 do not necessarily require separate motors, and certain of the drives may share common motors or prime movers. Also, certain of the drives may be connected to certain of the other drives.

Obviously, numerous variations of individual elements and devices are possible without exceeding the scope of the present invention. Thus, for example, in place of a rotating cutting bar, a rotating cutting roll may be provided, with a plurality of blades mounted on its circumference. Furthermore, the separating device may be in the form of a separate structural unit arranged on successive conveyor belts.

Finally, the control of the blade or blades may be effected by means of adjustable timing elements, actuated, for example, by a light barrier.

What is claimed is:

1. An installation for the coating of baked products with a viscous edible spreading mass applied at a certain temperature of application, which viscous material is adhesive at the temperature of application, the coating installation comprising:

a transport installation for moving the baked products along a transport path in a transport direction, the transport installation having an upwardly facing side on which the baked products are carried;

a revolvable generally cylindrical coating roll located above the transport installation, the coating roll having a bottommost point constituting a bottom crest line and an uppermost point constituting an apex, the coating roll also having a surface, the coating roll revolving in a certain direction of rotation;

a coating roll blade cooperating with the coating roll in the vicinity of said bottom crest line;

an application reservoir cooperating with the coating roll and being located after the coating roll blade when considered with respect to the direction of rotation of the coating roll and being located entirely between said bottom crest line and said apex, the reservoir being fillable with spreading mass, part of the application reservoir facing in an upward direction away from the transport installation, and another part of the application reservoir facing in a downward direction toward the transport installation;

a coating roll squeegee cooperating with said coating roll and with said application reservoir, said coating roll squeegee being disposed after said application reservoir, also when considered with respect to the direction of rotation of the coating roll;

whereby the application reservoir applies the spreading mass to the coating roll, the coating roll squeegee controls the thickness of the spreading mass on the coating roll and the coating roll blade removes the spreading mass from the coating roll in the form of a layer, which layer of spreading mass is then deposited on the baked products transported by the transport installation.

2. Installation according to claim 1, wherein the coating roll has a coating roll axle for permitting rotation of the coating roll, wherein a reservoir axle is arranged parallel to the coating roll axle and wherein the reservoir is pivotable around the reservoir axle, the reservoir having a certain center of gravity when filled with spreading mass, the reservoir axle being located closer to the coating roll axle, when viewed in the running direction of the baked products, than the center of gravity of the application reservoir filled with the spreading mass.

3. Installation according to claim 2, wherein the application reservoir includes a cavity which is open toward the coating roll and wherein the application reservoir is equipped with a jacket enclosing the cavity which is open toward the coating roll.

4. Installation according to claim 3, wherein the jacket is filled with oil.

5. Installation according to claim 3, wherein the application reservoir has an upper limit disposed adjacent the coating roll and at a forwardmost point relative to the direction of rotation of the coating roll, the application reservoir having an opening directed toward the coating roll, which opening is defined by an edge, the edge of which opening rests tightly against the surface of the coating roll and forms a gap with the surface of the coating roll only at the upper limit of the coating roll.

6. Installation according to claim 5, wherein the baked products are wafer sheets, each wafer sheet having a width to be coated, the width to be coated being taken in a direction transverse to the transport direction, and wherein the opening of the application reservoir directed toward the coating roll has a width parallel to the reservoir axle.

7. Installation according to claim 6, wherein the width of the opening of the application reservoir directed toward the coating roll corresponds to the width to be coated of the wafer sheets.

8. Installation according to claim 6, wherein the width of the opening of the application reservoir directed toward the coating roll is adjustable.

9. Installation according to claim 1, wherein the coating roll squeegee is adjustable with respect to the surface of the coating roll.

10. Installation according to claim 9, wherein the coating roll squeegee is in the form of a displaceable strip mounted on the application reservoir.

11. Installation according to claim 9, wherein the coating roll squeegee seals the application reservoir in the upward direction.

12. Installation according to claim 9, wherein the coating roll squeegee is arranged above the application reservoir and separately of the latter.

13. Installation according to claim 9, wherein the coating roll squeegee has a wedge shaped edge pointing in the direction of rotation of the coating roll.

14. Installation according to claim 9, wherein the coating roll squeegee is displaceable in a direction toward and away from the surface of the coating roll.

15. Installation according to claim 9, wherein the coating roll squeegee is pivotable toward and away from the surface of the coating roll.

16. Installation according to claim 1, wherein the application reservoir is in the form of a trough open both in the upward direction and also in a direction toward the coating roll.

17. Installation according to claim 1, wherein the baked products are wafer sheets defined by edges, wherein the wafer sheets abut one another in at least certain parts of the transport installation, and wherein a separating device is disposed in a position following the coating roll when considered with respect to the direction of transport of the baked products in the form of wafer sheets, the separating device being for separating wafer sheets from each other, which sheets have been connected with each other by the deposit of the spreading mass thereon.

18. Installation according to claim 17, including at least one light barrier cooperating with the separating device and wherein the separating device is equipped with a separating blade for separating the wafer sheets joined together by the spreading mass and abutting against each other, the separating blade being coated with a film to prevent the adhesion of the spreading mass to the separating blade, the separating blade being controlled by the at least one light barrier, the separating blade having a cutting edge which is movable in a cutting edge path.

19. Installation according to claim 18, wherein the separating device is equipped with a rotating cutting bar which includes the separating blade, the rotating cutting bar being arranged transversely to the direction of transport, the cutting bar being coated with a film of oil at least on the cutting edge of the separating blade.

20. Installation according to claim 18, wherein the separating device includes a cutting roll arranged transversely to the direction of transport above the transport installation and wherein the blade separating the wafer sheets includes a plurality of separating blades arranged on the cutting roll.

21. Installation according to claim 18, including:
a generally cylindrical oil applicator roll for the application of an oil film to the cutting edge of the blade, the applicator roll being arranged parallel to the blade and engageable by it; and
a generally cylindrical feed roll and an oil bath cooperating with the oil applicator roll, the oil applicator roll being in circumferential contact with the feed roll, the feed roll dipping into the oil bath.

22. Installation according to claim 21, wherein the separating blade is equipped with its own drive actuable by the light barrier, while the oil applicator roll and the feed roll are supported in a freely rotating manner and are moved merely by the contact of the separating blade with the oil applicator roll.

23. Installation according to claim 22, wherein the oil applicator roll and the feed roll are connected with the drive of the separating blade.

24. Installation according to claim 18, wherein the wafer sheets have wafer edges which extend transversely to the direction of transport and wherein the separating blade takes the form of separating blades revolving in a cutting direction and moving along the wafer edges which extend transversely to the direction of transport, the separating blades being movable along a path.

25. Installation according to claim 24, wherein the revolving separating blades are mounted on an endless chain arranged below the path of the wafer sheets on the transport installation and revolving transversely to said path, with the blades extending from below the path to above the path of the wafer sheets.

26. Installation according to claim 25, wherein the transport installation includes a plurality of segments including a coating roll segment moving the wafer sheets under and past the coating roll and wherein the separating device which comprises a plurality of blades revolving below the path of the wafer sheets is disposed sequentially after the coating roll in sequence, when considered with respect to the direction of transport of the wafer sheets.

27. Installation according to claim 26, wherein the coating roll segment of the transport installation includes a first end located before the coating roll and a second end located after the coating roll when considered with respect to the direction of transport of the wafer sheets, wherein said light barrier is at the second end of the coating roll segment of the transport installation for actuating movement of the separating blade, the separating blade being disposed on a blade support which is rotatable via a support axle, the light barrier being located at a distance from the support axle of the blade support, which distance corresponds to the length of a wafer sheet in the direction of transport, reduced by a distance X corresponding to the distance through which a wafer sheet moves in the direction of transport during the movement of each cutting edge from a rest position to a cutting position in which cutting position the cutting edge cooperates with an edge of a wafer sheet.

28. Installation according to claim 27, wherein the cutting edge path is at least partially circular, the cutting edge moving at a certain circumferential velocity, wherein the transport installation includes a conveyor belt moving at a certain velocity, and wherein the distance X corresponds to the following formula:

$$X = (D\pi/360)\alpha F$$

wherein D is the diameter of the at least partially circular path in which the cutting edge of the blade moves, $\alpha$ an angular position of each separating blade in its rest position, measured, in a plane normal to the support axle of the blade support, from the cutting position of each blade, and F the ratio of the circumferential velocity of the cutting edge of the blade to the velocity of the conveyor belt.

29. Installation according to claim 24, wherein the separating blades have cutting edges and wherein a cleaning apparatus is provided for each cutting edge of the separating blades.

30. Installation according to claim 29, wherein the cleaning apparatus for the cutting edges of the separating blades is in the form of an elastically yielding squeegee which is engageable with the cutting edges and which is located in a certain position in the cleaning apparatus, the elastically yielding squeegee being displaceable from its position in the cleaning apparatus by engagement by the cutting edges.

31. Installation according to claim 24, wherein the separating blades have cutting edges and wherein an oiling apparatus is provided for each edge of the blades.

32. Installation according to claim 31, wherein the oiling apparatus for the blade edges includes a transfer element arranged along the path of the blades and an oil reservoir, the transfer element dipping into the oil reservoir.

33. Installation according to claim 24, wherein the separating blades have cutting edges and wherein the cutting edges of the separating blades are coated with Teflon.

34. Installation according to claim 24, wherein the separating blades, which revolve transversely to the direction of transport, are equipped with cutting edges arranged perpendicularly to the direction of transport.

35. Installation according to claim 24, wherein the separating blades, which revolve transversely to the direction of transport, are in the form of thin pins.

36. Installation according to claim 18, wherein the separating device includes an endless chain, at least part of which is arranged above the transport installation for the wafer sheets, the separating blades being mounted on the endless chain, the chain revolving transversely to the transport direction of the wafer sheets, the separating blade including a plurality of separating blades mounted on the endless chain, the separating blades extending to the upwardly facing side of the transport installation.

37. Installation according to claim 36, wherein the endless chain carrying the blades is pivotable with respect to the direction of transport.

38. Installation according to claim 36, wherein the transport installation defines a transport plane corresponding with the upwardly facing side of the transport installation and wherein the separating blades revolve transversely to the direction of transport of the endless chain carrying the separating blades, the endless chain having a pair of strands located one above the other, the endless chain revolving in a plane which is inclined with respect to the transport plane, one strand of the chain being arranged above the transport plane, the other strand of the chain being arranged at a distance from the transport plane, the separating blades each having a cutting edge for cooperation with an edge of a wafer, which edge extends transversely to the direction of transport, each strand of the endless chain having a running direction which is in a plane parallel to the transport path.

39. Installation according to claim 18, wherein the transport installation includes a plurality of segments, including a coating roll segment for moving the wafer sheets under and past the coating roll, wherein the coating roll segment includes a first end located before the coating roll and a second end located after the coating roll when considered with respect to the direction of transport of the wafer sheets, and wherein a light barrier is arranged both at the first and at the second end of the coating roll segment of the transport installation, the light barrier at the first end being a front light barrier, the light barrier at the second end being a second light barrier, the distance between the two light barriers corresponding to a multiple integer of the length of the wafer sheets to be coated, which distance and length are measured in the direction of transport.

40. Installation according to claim 39, including a wedge cooperating with the transport installation, the transport installation having lateral sides, the edges of the wafer sheet joining each other to define corner areas, the wedge guiding the wafer sheets laterally with respect to the transport path, the wedge extending into said transport path from one side to displace the wafer sheets laterally, the wedge being located on one lateral side of the transport installation, the wedge being arranged in front of the light barrier located at the first end of the coating roll segment of the transport installation as considered with respect to the direction of transport, the light barrier at the first end of the transport segment being arranged above the transport path of the wafer sheets in the corner area of the wafer sheets, so that an edge of a wafer sheet between two successive wafer sheets which abut against each other may be measured.

41. Installation according to claim 40, including means for actuating the separating device upon the simultaneous indication of the presence of a wafer sheet edge by both the front light barrier and the rear light barrier.

42. Installation according to claim 40, including means for actuating the separating device only when the presence of a wafer sheet edge is indicated by the front light barrier.

43. Installation according to claim 18, wherein the transport installation includes a plurality of segments including a coating roll segment and a transport segment, the transport segment being located after the coating roll segment when considered with respect to the direction of transport of the wafer sheets, the coating roll segment being movable at a transport velocity, the transport segment also being movable at a transport velocity, and wherein the transport velocity of the transport segment is higher than the transport velocity of the coating roll segment.

44. Installation according to claim 43, wherein the transport installation is lowerable with respect to the transport path.

45. Installation according to claim 43, wherein the separating device is located between the coating roll segment of the transport installation and the transport segment thereof.

46. Installation according to claim 18, wherein the transport installation includes a plurality of segments including a coating roll segment for moving the wafer sheets under and past the coating roll, the coating roll segment being preceded, as considered with respect to the direction of transport, by three successive segments of the transport installation for the wafer sheets, the coating roll segment being driven at a certain velocity, the three preceding segments including a first segment which is positioned first in the direction of transport as compared with the remaining segments, a second segment positioned second in the direction of transport as compared with the first segment, and a third segment positioned third in the direction of transport as compared with the first and second segments, the first, second and third coating roll segments being driven at certain velocities, the second segment having the same transport velocity as the coating roll segment, the first and third segments having slightly higher transport velocities.

47. Installation according to claim 46, wherein the second segment of the transport installation is drivingly coupled with the coating roll segment of the transport installation.

48. Installation according to claim 46, wherein a light barrier is arranged between the second and the third segments of the transport installation.

49. Installation according to claim 18, wherein the separating blade of the separating device includes a plurality of separating blades which are movable transversely to the direction of transport of the wafer sheets and wherein the separating device also includes a pneumatic piston for moving the separating blades transversely to the direction of transport of the wafer sheets, the pneumatic piston being mounted for upward and downward movement relative to the transport installation, whereby the separating blades may be raised after a cutting stroke and returned during a return stroke above the path of the wafer sheets, without contacting the latter, and lowered again for the cutting stroke.

50. Installation according to claim 38 or 49, wherein guide rails are provided, adjacent the transport installation in the vicinity of the separating device, for the lateral support of the wafer sheets during movement of the separating blades transversely to the direction of transport of the wafer sheets.

51. Installation according to claim 17:
wherein said transport installation includes a separating point at which the separating device is located, the wafer sheets being in a separating position when at the separating point, and
including means for actuating the separating device by the front edge of the wafer sheets when the wafer sheet is in the separating position.

52. Installation according to claim 17, wherein the transport installation includes a conveyor belt with a surface and wherein an oiling device is provided for the conveyor belt, the oiling device being located below the transport installation and under the coating roll.

53. Installation according to claim 52, wherein the oiling device includes an oil reservoir and a transfer element for applying the oil to the surface of the transport belt.

54. Installation according to claim 53, wherein the transfer element includes a strip of an absorbent element in contact with the surface of the conveyor belt, the strip having ends, the strip extending with one end into the oil reservoir.

55. Installation according to claim 52, wherein the oiling device comprises a generally cylindrical oil applicator roll, a generally cylindrical feed roll, and an oil reservoir, the feed roll being in circumferential contact with the oil applicator roll, the feed roll also dipping into the oil reservoir.

56. Installation according to claim 55, wherein the feed roll has its own drive.

57. Installation according to claim 56, wherein the feed roll is made of metal.

58. Installation according to claim 55, wherein the oil applicator roll is made of foam rubber.

59. Installation according to claim 55, wherein the oil applicator roll has a surface covered with a layer of felt.

60. Installation according to claim 55, wherein the oil applicator roll has its own drive.

61. Installation according to claim 17, wherein the coating roll has width transverse to the transport direction, the wafer sheets having a maximum width transverse to the transport direction, the width of the coating roll being larger than the maximum width of the wafer sheets.

62. Installation according to claim 17, wherein both the coating roll blades and also the wafer sheets have widths transverse to the transport direction and wherein the width of the coating roll blade for taking the layer of the spreading mass from the coating roll is larger than the width of the wafer sheets.

* * * * *